2,822,375
PROCESS FOR THE MANUFACTURE OF BENZONITRILE

Alfred Renner, Basel, Walter Wettstein, Munchenstein, near Basel, and Gustav Widmer, Basel, Switzerland, assignors to Ciba Limited, Basel, Switzerland, a Swiss firm No Drawing. Application June 4, 1956
Serial No. 589,011

Claims priority, application Switzerland June 9, 1955

3 Claims. (Cl. 260—465)

This invention provides a continuous process for the manufacture of benzonitrile, wherein an aromatic hydrocarbon capable of yielding phthalic anhydride by oxidation, advantageously naphthalene, is subjected in the vapor phase to catalytic oxidation with air, and the oxidation product so obtained, and without being cooled and isolated, is converted in the vapor phase by catalytic reaction with ammonia into benzonitrile.

As oxidation catalyst there is suitable above all vanadium pentoxide supported on a suitable carrier, such as silica gel or alumina. Other heavy metal oxides, such as are customary for the oxidation of naphthalene, may be used. The action of the oxidation catalyst may be modified with an added substance capable of diminishing the violence of the reaction and the risk of total combustion, such as phosphorus pentoxide, potassium hydrogen sulfate or potassium sulfate.

As catalysts for converting the oxidation products into benzonitrile there may be used the catalysts usual for such dehydration reactions, such as aluminium oxide. Silica gel usually gives better yields than aluminium oxide and is therefore preferred.

The process of this invention has the advantage that benzonitrile can be obtained from naphthalene, which is a readily accessible substance, in a continuous manner and in good yield when silica gel is used, in lower yield when aluminium oxide is used for converting the oxidation products into benzonitrile. Instead of naphthalene, there may be used ortho-xylene or an analogous aromatic hydrocarbon capable of yielding phthalic acid anhydride by oxidation; with these hydrocarbons, however, there were attained lower yields than with naphthalene.

The process may be carried out by preheating a gaseous mixture of air and naphthalene in a ratio within the range of 20:1 to 50:1, and advantageously 24:1, to a temperature up to 350° C., and passing the mixture at a space velocity within the range of 500 to 4000, and advantageously 1000, parts by volume per volume of catalyst per hour over the catalyst heated at a temperature of 300° C. to 500° C., and advantageously 350° C. After the oxidation, there is added to the hot gaseous reaction products at least 1 mol, and advantageously 2 to 3 mols, of ammonia per mol of naphthalene. The gaseous mixture is then passed at a space velocity within the range of 100 to 1000, and advantageously 500, volumes per volume of catalyst per hour over a catalyst which is capable of promoting the splitting off of water and carbon dioxide, advantageously silica gel, and is heated at a temperature within the range of 360° C. to 500° C., and advantageously 390° C. to 420° C. The reaction products so obtained are cooled. The benzonitrile is separated from the rapid current of air in a suitable manner and then purified. The yield of benzonitrile is 65–75% of the theoretical yield calculated on the naphthalene introduced.

The following examples illustrate the invention:

Example 1

A current of air containing 50 milligrams of naphthalene per litre is preheated to 250° C. at a speed of 200 litres per hour, and passed over 200 cc. of a catalyst consisting of 10% of vanadium pentoxide, 25% of potassium sulfate and 65% of silica gel as carrier. The reaction tube containing the catalyst is maintained in a salt bath at a temperature of 350° C. After leaving this first catalyst zone, the gaseous stream is mixed with 5.2 litres of ammonia per hour, which corresponds to 3 mols of $NH_3$ per mol of naphthalene. This hot gaseous mixture is passed over 400 cc. of highly porous silica gel having a bulk density of about 0.4 and heated at 390–420° C. The issuing gaseous mixture is passed through an efficient condenser in which the greater part of the benzonitrile formed and also the water formed by the reaction and a small amount of ammonium carbonate are condensed. These reaction products are collected in a receiver. In order to separate the benzonitrile completely from the rapid gaseous stream, the latter, after leaving the condenser, is passed into an absorption tower charged with silica gel. The benzonitrile separated in the absorption tower can be isolated by distillation with steam. The yield of benzonitrile is 70% of the theoretical yield calculated on the quantity of naphthalene introduced.

It is not essential to use pure naphthalene. Equally good results are obtained by using commercial naphthalene. In this case it is desirable to insert in the reaction tube immediately following the oxidation zone a substance, for example, sodium carbonate on pumice, capable of adsorbing the oxides of sulfur.

Example 2

The oxidation of naphthalene is carried out in the manner described in Example 1. There are added to the gaseous stream leaving the first catalyst zone 8.1 litres of gaseous ammonia per hour, which corresponds to 4.6 mols of $NH_3$ per mol of naphthalene. The resulting gaseous mixture is passed over 600 cc. of active alumina, which is heated at 390–420° C. The benzonitrile is isolated and purified in the manner described in Example 1. The yield amounts to about 25% of the theoretical yield calculated on the naphthalene introduced.

Example 3

4 grams of ortho-xylene per hour are vaporized in a current of air having a speed of 240 litres per hour. The gaseous mixture is heated to 450° C. and passed over 60 cc. of an oxidation catalyst consisting of vanadium pentoxide on pumice and containing about 12% of $V_2O_5$. A reaction tube containing the catalyst is maintained at 470° C. by means of a salt bath surrounding the tube. To the hot gaseous stream leaving the first catalyst zone are added 6.4 litres of gaseous ammonia per hour, that is to say, 6.25 mols of $NH_3$ per mol of ortho-xylene vapor. The resulting hot gaseous stream is then passed over 480 cc. of highly porous silica gel having a bulk density of approximately 0.5, which is heated to 410° C. The issuing gaseous mixture is passed through an efficient condenser in which the greater part of the benzonitrile formed and also water formed by the reaction and a small amount of ammonium carbonate are condensed. The further treatment is as described in Example 1. The yield of benzonitrile is 36% of the theoretical yield calculated on the ortho-xylene vapor.

What we claim is:

1. A continuous process for the manufacture of benzonitrile, wherein an aromatic hydrocarbon selected from the group consisting of naphthalene and o-xylene is subjected in the vapor phase to catalytic oxidation with air, and the oxidation product so obtained, and without being cooled and isolated, is converted in the vapor phase into benzonitrile by passing it with ammonia over a highly porous silica gel having a bulk density of at the most 0.5 at a temperature within the range of 360° C. to 500° C.

2. A continuous process for the manufacture of benzonitrile, wherein naphthalene is subjected in the vapor phase to catalytic oxidation with air, and the oxidation product so obtained, and without being cooled and isolated, is converted in the vapor phase into benzonitrile by passing it with ammonia over a highly porous silica gel having a bulk density of at the most 0.5 at a temperature within the range of 360° C. to 500° C.

3. A continuous process for the manufacture of benzonitrile, wherein naphthalene is subjected in the vapor phase to catalytic oxidation with air, and the oxidation product so obtained, and without being cooled and isolated, is converted in the vapor phase into benzonitrile by passing it with ammonia over a highly porous silica gel having a bulk density of at the most 0.5 at a temperature of 390° to 420° C.

References Cited in the file of this patent

UNITED STATES PATENTS

| | | |
|---|---|---|
| 2,100,401 | Linstead et al. | Nov. 30, 1937 |
| 2,574,644 | Landau | Nov. 13, 1951 |

FOREIGN PATENTS

| | | |
|---|---|---|
| 893,500 | Germany | Oct. 15, 1953 |
| 899,800 | Germany | Dec. 17, 1953 |